Figure 1:
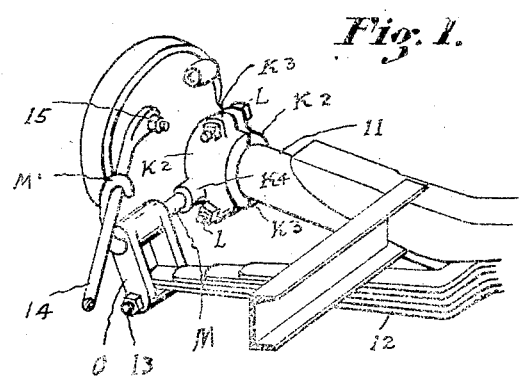

UNITED STATES PATENT OFFICE.

ROBERT M. ROOF, OF ANDERSON, INDIANA, ASSIGNOR TO LAUREL MOTORS CORPORATION, OF ANDERSON, INDIANA.

REAR-AXLE SPRING-BAR CONNECTION DEVICE.

1,381,432.          Specification of Letters Patent.     Patented June 14, 1921.

Application filed June 3, 1920. Serial No. 386,385.

*To all whom it may concern:*

Be it known that I, ROBERT M. ROOF, a citizen of the United States, residing at Anderson, in the county of Madison and State of Indiana, have invented certain new and useful Improvements in Rear-Axle Spring-Bar Connection Devices, of which the following is a specification.

This invention relates to improvements in spring-bar connections for motor-cars.

In construction as practised in well known motor cars of standard type of the lighter class; a detail of well known structure, and which constitutes a connection between the rear axle housing and the rear spring member of the frame, consists of a shackle link arrangement loosely connected to the rear axle housing and which has connection with the end of the spring at a location above the rear axle housing.

The object of this invention is to provide an improved connection device for the said rear spring capable of being secured to and supported by the standard rear axle housing and the radius or brace rod of the car frame, whereby the said spring member while being securely retained, is so retained at a position substantially lower than that of the axle housing.

Such a connecting arrangement is desirable for the reason that by its use, the points of suspension of the spring are lowered, and the body of the car and its parts are correspondingly lowered. Such lowered status of the car body renders more safe the operation of the car at higher speeds, and minimizes the stress and strain imparted to the rear axle housing of the car.

The purposes of the invention are accomplished by the new construction, combination and arrangement of parts shown in the annexed drawing, described in the following specification, and defined in the appended claims.

In the drawings, Figure 1 represents a perspective view of my improved rear spring-bar connection device, and in which view the relative positions of the axle housing and the radius rod are shown. The several parts of my invention are identified by suitable characters of reference applied thereto.

The present invention consists of a divided block, the matched portions of which are capable of being secured together and in clamping contact with the rear axle housing, there being a bar extended from said block and having its upturned end adapted to be supported by the radius rod, and a shackle connection on said bar, all of said parts being so combined and arranged, that there is constituted a connection between the axle shaft housing 11, the radius rod 14 and the end of the spring 12, whereby the spring is supported at a point on a plane below the plane of the axle shaft housing. The radius rod 14 occupies the usual position with reference to the axle housing, as shown in the drawing, its forked end being secured to the axle housing by the bolts 15.

The aforesaid block is made of complemental sections $K^2$ and $K^2$ preferably of manganese bronze, or it may be made of any other suitable metal of proper strength. Through the matched upper and lower ears $K^3$ are passed the bolts L and L, which bolts, when tightened, clamp the two body pieces tenaciously to the rear axle housing. A support bar M made of machine steel of proper diameter has its rear end secured in a boss $K^4$ that is formed integrally on the lower portion of the said block. Loose on this bar M is a shackle clevis O of usual construction and function. The end of the spring 12 is supported by a transverse bolt or pin 13 of said clevis. The outer portion of the support bar M is turned upwardly thence has a hook end $M^1$ that engages over the top side of the radius rod and is supported thereby. It is obvious that the connection device just described is capable of being easily installed in position without any modification whatever of the several standard parts, and in such position it is sustained ruggedly and immovably.

The utility of this connecting device for the spring suspension is apparent. The device having been installed at position and the spring-bar connection having been made by the shackle bolt 13, the points of the spring suspension will have been substantially lowered, thus affording advantages incident to the lowering of the center of gravity of the car structure proper. One of the important advantages is that such lowering of the car body and frame, permits the drive shaft of the car to assume a position parallel to the center line of the motor shaft, the result being a lessening of friction in the universal joint and in the bearings of the drive shaft. Cars equipped with this invention are capable of being operated safely at a speed much greater than would be the case were the spring ends connected at points above the top of the rear axle housing.

Moreover the car has improved riding qualities and there is improved manner of transmission of the strains from the springs to the axle housing.

In this specification is shown the preferred form of embodiment of my invention. I am aware that minor changes may be made in the form of the block, and in the form and arrangement of the parts thereof, without in the least departing from the nature and spirit of the invention, or the sacrificing of any of its advantages.

What I claim as my invention, and desire to secure by Letters Patent, is—

1. A spring-support connection device, consisting of a divided block adapted to be clamped on the axle shaft housing, a support bar extending from said block and adapted to be connected to the radius rod, a shackle clevis carried loosely on the support bar.

2. A spring-bar connection device, consisting of a divided block the half sections of which are adapted to be clamped on the axle shaft, means to draw the half sections of said block toward each other and to retain same at tenacious engagement with the axle shaft housing, and a support bar laterally extended from said block, and adapted to be connected to the radius rod.

3. A spring-bar connection device, consisting of a divided block the half sections of which are adapted to be clamped on the axle shaft, means to draw the half sections of said block toward each other and to secure same at tenacious engagement with the axle shaft housing, a support bar secured to the lower portion of the block and radius rod, and a shackle clevis carried loosely on said support bar.

4. In combination with the axle shaft housing, and the radius rod, a divided block adapted to be clamped securely to said axle shaft housing, a support bar having its rear end secured to the lower portion of said block, and its forward portion turned upwardly and having a hook end to engage the top side of the radius rod, and a shackle clevis carried loosely on the support bar and adapted to support the end of the car spring, substantially as described.

5. A support device for the car springs, consisting of a block detachably secured to the rear axle housing, a support bar extended from the block and having a hook end to make connection with the radius rod, a shackle connection carried loose on the support bar, and a removable support pin in the clevis that is adapted to retain the end of the car spring.

In testimony whereof I affix my signature.

ROBERT M. ROOF.